United States Patent [19]

De Vall et al.

[11] Patent Number: 4,458,548

[45] Date of Patent: Jul. 10, 1984

[54] PINION CARRIER

[76] Inventors: Donald L. De Vall, 1082 Charles Ave.; Hu D. De Vall, Rte. 1, Box 362-A, both of Morgantown, W. Va. 26505

[21] Appl. No.: 337,735

[22] Filed: Jan. 7, 1982

[51] Int. Cl.³ ............... F16H 57/04; F16H 1/14; F02F 11/00; F02F 5/00
[52] U.S. Cl. ............... 74/467; 277/153; 277/29; 74/423
[58] Field of Search ............... 74/467, 417, 423; 277/153, 152, 29, 58

[56] References Cited

U.S. PATENT DOCUMENTS

| | | | |
|---|---|---|---|
| 2,736,583 | 2/1956 | Marvin | 277/153 |
| 2,971,783 | 2/1961 | Laser | 277/29 |
| 3,190,369 | 6/1965 | Pyles | 173/23 |
| 3,572,379 | 3/1971 | Popa et al. | 277/29 |
| 3,575,426 | 4/1971 | Durham | 277/153 |
| 3,606,352 | 9/1971 | Lutz | 277/58 |
| 3,612,547 | 10/1971 | Kan | 277/153 |
| 3,678,809 | 7/1972 | Doutt | 277/29 |
| 3,901,434 | 8/1975 | Wright | 277/29 |
| 4,085,941 | 4/1978 | Wilkinson et al. | 277/29 |
| 4,190,116 | 2/1980 | O'Neal et al. | 74/467 |
| 4,254,793 | 3/1981 | Scaramulli | 277/29 |
| 4,294,317 | 10/1981 | Amoroso | 173/57 |
| 4,337,956 | 7/1982 | Hopper | 277/152 |
| 4,344,631 | 8/1982 | Winn | 277/153 |
| 4,346,801 | 8/1982 | Redder et al. | 277/29 |

FOREIGN PATENT DOCUMENTS 974751 11/1964 United Kingdom ............... 277/29

*Primary Examiner*—Lawrence J. Staab
*Assistant Examiner*—Michael D. Bednarek
*Attorney, Agent, or Firm*—Webb, Burden, Robinson & Webb

[57] ABSTRACT

A drill head having a drill head casing, a rotatable support member for a drill steel, a ring gear nonrotatably attached to the rotatable support member and a pinion gear driving the ring gear. A carrier for the pinion gear having a housing attached to the drill head casing and a pinion shaft rotatably supported in the housing. The pinion gear is nonrotatably mounted on one end of the pinion shaft and the other end of the pinion shaft has an elongated cavity which nonrotatably receives the drive shaft of a motor. Bearings are located between the pinion shaft and the housing and seals are located between the pinion shaft and the housing adjacent to the bearings. A nut is threaded on each end of the pinion shaft to retain the pinion gear and the bearings on the pinion shaft.

10 Claims, 2 Drawing Figures

PINION CARRIER

BACKGROUND OF THE INVENTION

1. Field of the Invention

The invention relates generally to an improved pinion gear carrier for use in a rotary drill head and particularly to a pinion gear carrier which may be easily and quickly removed from the drill head casing and which is constructed so that if a seal in the hydraulic drive motor for the pinion gear fails, the pressurized fluid from the hydraulic motor will be released to atmosphere and hence will not blow seals located in the drill head casing or the pinion carrier housing.

2. Description of the Prior Art

Both percussion and nonpercussion rotary drills are used in rock drilling, and the drill steel which carries the bit is supported in a rotary member in the drill head. The lower end of the rotary member is attached to a ring gear, and a socket like portion is formed at the upper end to support the drill steel. The ring gear is normally driven by a pinion gear which is driven by a hydraulic drive motor. The hydraulic motor has a rotatable drive shaft which is nonrotatably connected to the pinion gear so that the hydraulic drive motor rotates the pinion gear to rotate the ring gear and the member which carries the drill steel. In prior art drill heads, the pinion gear is located inside of the drill head casing and the hydraulic drive motor which drives the pinion gear is located outside of the housing. The motor drive shaft extends through bearings and seals located in the drill head casing. In this arrangement, when either the hydraulic drive motor or the pinion gear fail, it is necessary to tear down the drill head in order to replace either of them, and this is both time consuming and expensive. Additionally, if the seals in the casing of a prior art drill head fail, dirt and rock dust enter the drill head casing and this causes bearing failure. An example of a prior art drill head is shown in U.S. Pat. No. 3,190,369.

SUMMARY OF THE INVENTION

The invention provides a pinion gear carrier for use in a rotary drill head which may be quickly and easily removed from the drill head casing when necessary for replacement of either the pinion gear or the hydraulic drive motor for the pinion gear. The pinion gear carrier housing is provided with a passage to atmosphere which permits escape of pressurized fluid directly to the atmosphere if a seal in the hydraulic drive motor fails. This arrangement prevents the pressurized fluid from the hydraulic motor from blowing seals in the pinion gear carrier housing or inside the drill casing.

DESCRIPTION OF THE PREFERRED EMBODIMENT

Figure 1:
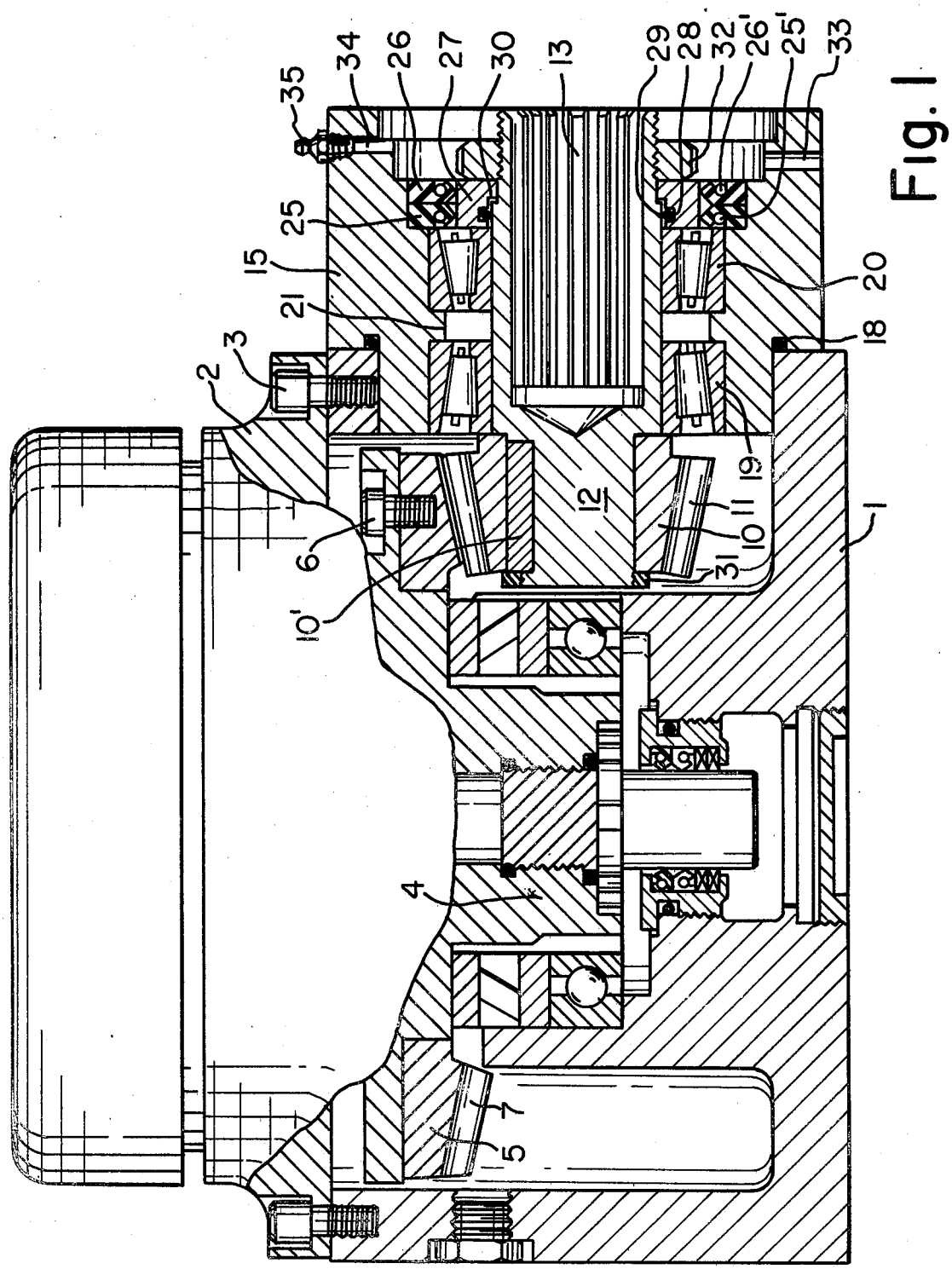
FIG. 1 is a partial vertical section through a rotary drill head having the pinion gear carrier of the invention mounted thereon.
Figure 2:
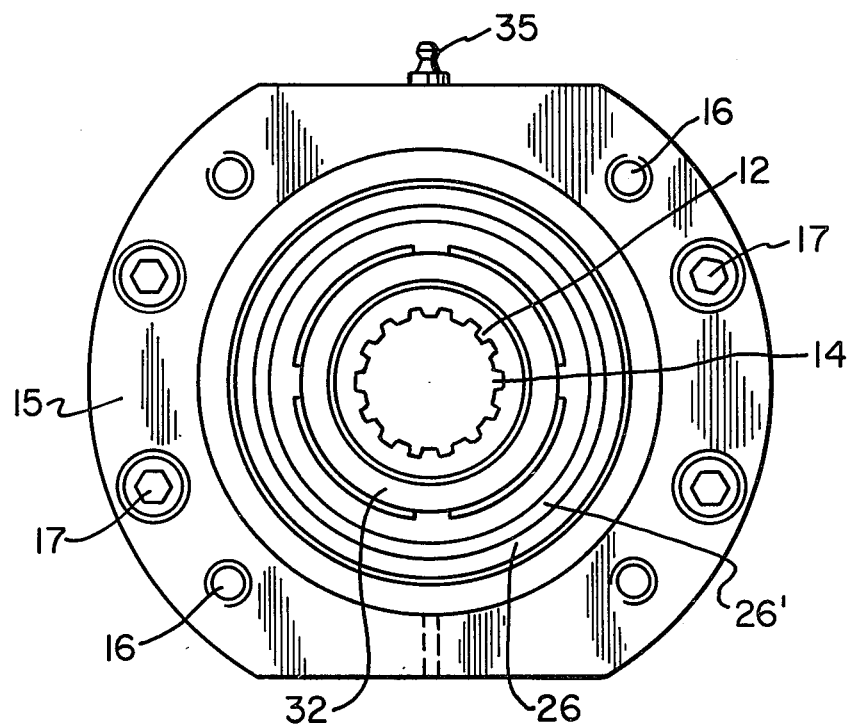
FIG. 2 is an end view of the pinion carrier shown in FIG. 1.

With reference to the drawings, it will be seen that the pinion gear carrier housing is mounted on a drill head casing 1 which has a cover 2 attached on the upper end by machine screws 3 which are threaded into tapped holes in casing 1 and which carries an elongated rotary member 4 which extends upwardly from the lower part of the drill head and which has a socket like portion (not shown) to support a drill steel and attached bit. A ring gear 5 is nonrotatably attached to member 4 by a plurality of machine screws 6. When ring gear 5 is rotated, member 4 is also rotated along with the drill steel carried in the socket like portion at upper end of member 4. The ring gear has teeth 7 located on its lower surface throughout its circumference. The design of member 4 with a socket like portion at the upper end and of ring gear 5 is well known to those skilled in the art and forms no part of the present invention.

Ring gear 5 is driven by a bevel pinion gear 10 which has teeth 11 around its periphery which mate with teeth 7 on ring gear 5. Pinion gear 10 is carried on the stub end of a pinion shaft 12 and is nonrotatably attached to the pinion shaft by an elongated key 10'. Pinion shaft 12 has an elongated internal cavity 13 which is formed with elongated axial internal splines 14 throughout its circumference. The internal splines 14 cooperate with external splines formed on the drive shaft of the hydraulic motor (not shown) which is attached to the end of pinion carrier housing 15 by machine screws which are received by tapped holes 16 in the outer end of pinion carrier housing 15. While four holes 16 are shown in the end of pinion carrier housing 15, it will be understood by those skilled in the art that any number of holes may be tapped in the end of the pinion carrier housing in an arrangement to accommodate the mounting holes in the flange of the hydraulic motor which is mounted on the end of the pinion carrier housing. The pinion carrier housing is attached to drill head casing 1 by four cap screws 17 which extend through the pinion carrier housing into tapped holes in the drill head casing. A compressible O-ring seal 18 is located in an annular groove in the pinion carrier housing to seal the joint between the pinion carrier housing and the drill head casing in order to ensure that no oil leaks from the drill head casing.

The pinion shaft is supported in pinion carrier housing 15 by a pair of cone bearings 19 and 20 which absorb a large percentage of the thrust imparted to the pinion shaft by the hydraulic motor drive shaft when the hydraulic motor is in operation. This arrangement of pinion shaft 12 and bearings 19 and 20 extends the life of the hydraulic motor because there is less wear on the hydraulic motor. Each bearing 19 and 20 has its inner end held against an annular shoulder 21 which is formed on pinion carrier housing 15. Oil is provided to bearings 19 and 20 from the interior of drill head housing 1 which is filled by means of a rosebud oil gun.

A pair of garter-type seals 25 and 26 with annular coil springs 25' and 26' located in a notch on the pressure side are located on a chrome ring 27 which is mounted on the external surface of the pinion shaft toward the end which receives the hydraulic motor drive shaft. Seal 25 is the inside seal and has its pressure side facing inwardly to hold oil within the drill head casing and adjacent to bearings 19 and 20. Seal 26 is the outside seal and has its pressure side facing the hydraulic motor in order to keep dirt away from the inner seal 25 and to maintain the oil pressure within the drill head if the seal in the hydraulic motor fails. Because seals 25 and 26 are mounted on chrome ring 27, it is easy and inexpensive to replace one or both of them when replacement is required. Chrome ring 27 has a notch 28 formed in its inner surface and an O-ring seal 29 is located in the notch. A shoulder 30 is formed on the inner surface of chrome ring 27, and this shoulder faces a complementary shoulder formed on pinion shaft 12 when the chrome ring is positioned on the shaft.

Bearings 19 and 20, beveled pinion gear 10 and chrome ring 27 are held on pinion shaft 12 by internally threaded nuts. Nut 31 is threaded on the end of shaft 12 adjacent pinion gear 10, and nut 32 is threaded on shaft 12 adjacent chrome ring 27. When the pinion gear, the cone bearings and the chrome ring are assembled on pinion shaft 12, nuts 31 and 32 are tightened on the ends of the pinion shaft which forces the inner ends of bearings 19 and 20 against shoulder 21 and forces shoulder 30 on chrome ring 27 toward the complementary shoulder on pinion shaft 12. The nuts hold the assembled elements in place on the pinion shaft.

A pressure relief port 33 is formed in pinion carrier housing 15 in order to connect the interior of the pinion carrier housing with atmosphere. If a seal fails in the hydraulic motor, the pressure from the motor will not blow seals 25 and 26 in the pinion carrier housing as would be the case if there were no pressure relief port in the pinion carrier housing. Since seals 25 and 26 maintain their integrity, the hydraulic motor may be replaced without any damage being done to bearings 19 and 20 or to the bearings within the drill head casing. This arrangement prevents dirt and rock dust from getting into the drill head casing when a motor is replaced.

A lubricant passage 34 is provided having a cap 35 threaded in its end so that lubricant can be added to the interior of the end of pinion carrier housing 15 after a hydraulic motor has been bolted to the end of the pinion carrier housing.

It will be seen that the novel pinion carrier of the invention results in an arrangement wherein the pinion gear and the pinion carrier housing can be quickly removed from the drill head for either repair or replacement. Additionally, motor failure will have no effect on the bearings in either the pinion carrier housing or the drill head casing.

While a preferred embodiment of the invention has been described herein, it is to be understood that the invention may be embodied within the scope of the appended claims.

We claim:

1. In a drill head having a drill head casing, a rotatable support member for a drill steel supported in said casing, a ring gear nonrotatably attached to said rotatable support member and a pinion gear driving said ring gear, the improvement comprising a pinion carrier for said pinion gear, said pinion carrier having a housing attached to said drill head casing, an axial passage extending through said housing, a pinion shaft extending through said axial passage in said housing, said pinion shaft having a stub at one end, means nonrotatably mounting said pinion gear on said stub of said pinion shaft, the other end of said pinion shaft having an elongated open ended axially extending cavity formed therein, the axial wall of said elongated cavity having means adapted to nonrotatably receive a drive shaft of a motor, bearing means located in said axial passage between said pinion shaft and said housing to rotatably mount said pinion shaft in said housing, seal means located in said axial passage between the end of said pinion shaft having said cavity formed therein and said housing, said seal means including a ring surrounding said shaft, said ring having an annular notch formed in its inner surface, an O-ring seal located in said annular notch between said ring and the surface of said pinion shaft, a pressure relief port formed in said housing adjacent said seal means and extending from said axial passage to the exterior of said housing, and means on said pinion shaft retaining said pinion gear, said bearing means and said ring on said pinion shaft, whereby said seal means prevent lubricant for said bearing means from leaking from said axial passage and protect said bearing means from dirt.

2. Apparatus as set forth in claim 1 wherein said seal means includes a first annular seal having a pressure side facing in one direction and a second annular seal adjacent said first annular seal and having a pressure side facing in the opposite direction, whereby said first annular seal prevents lubricant from escaping from said axial passage and said second annular seal prevents dirt from contacting said first annular seal and said bearing means.

3. Apparatus as set forth in claim 1 wherein said ring has an annular shoulder formed on its inner surface and said pinion shaft has a shoulder formed on its surface facing said annular shoulder on said ring when said ring is in position on said pinion shaft.

4. Apparatus as set forth in claim 1 wherein the surface of said axial passage in said housing has an annular shoulder formed thereon, and said bearing means includes a bearing on each side of said annular shoulder, one end of each of said bearings contacting a side of said shoulder when said bearings are in place between said pinion shaft and said housing.

5. Apparatus as set forth in claim 4 wherein each of said bearings is a cone bearing and the end of each of said bearings contacting said annular shoulder is the apex end.

6. Apparatus as set forth in claim 1 including a second seal means located between the surface of said drill head casing and said housing to prevent lubricant from leaking from the interior of said drill head casing.

7. A pinion carrier and a pinion gear supported by said carrier, said pinion carrier comprising a housing having an axial passage extending therethrough, a shaft extending through said housing in said axial passage, said shaft having a stub at one end, means nonrotatably mounting said pinion gear on said stub of said shaft, the other end of said shaft having an elongated open ended axially extending cavity formed therein, the axial wall of said cavity having means adapted to nonrotatably receive a drive shaft of a motor, bearing means located in said axial passage between said shaft and said housing to rotatably mount said shaft in said housing, seal means located in said axial passage between said shaft and said housing adjacent said bearing means, said seal means including a first annular seal having a pressure side facing in one direction, a second annular seal adjacent said first annular seal and having a pressure side facing in the opposite direction and a ring surrounding said shaft, said ring having an annular notch formed in its inner surface, an O-ring seal located in said notch between the inner surface of said ring and the surface of said shaft, a pressure relief port formed in said housing adjacent said seal means and extending from said axial passage to the exterior of said housing, and means on said shaft retaining said pinion gear and said bearing means on said shaft.

8. Apparatus as set forth in claim 7 wherein said ring has an annular shoulder formed on its inner surface and said shaft has a shoulder formed on its outer surface facing said annular shoulder on said ring.

9. Apparatus as set forth in claim 7 wherein the surface of said axial passage in said housing has an annular shoulder formed thereon, and said bearing means includes a bearing on each side of said annular shoulder, one end of each of said bearings contacting a side of said annular shoulder when said bearings are in place between said shaft and said housing.

10. Apparatus as set forth in claim 9 wherein each of said bearings is a cone bearing and the end of each of said bearings contacting said annular shoulder is the apex end.

* * * * *